United States Patent
Taira et al.

(10) Patent No.: US 6,398,524 B1
(45) Date of Patent: Jun. 4, 2002

(54) MAGNETIC BEARING CONTROL DEVICE AND TURBO-MOLECULAR PUMP DEVICE

(75) Inventors: Akiko Taira; Hiroyuki Chino; Toshiharu Nakazawa; Matsutaro Miyamoto, all of Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/555,648

(22) PCT Filed: Dec. 2, 1998

(86) PCT No.: PCT/JP98/05427

§ 371 (c)(1),
(2), (4) Date: Jun. 2, 2000

(87) PCT Pub. No.: WO99/28640

PCT Pub. Date: Jun. 10, 1999

(30) Foreign Application Priority Data

Dec. 2, 1997 (JP) ............................................. 9-347131
Dec. 10, 1997 (JP) ............................................. 9-361820

(51) Int. Cl.$^7$ ................................................. F04B 17/00
(52) U.S. Cl. ................................. 417/423.12; 310/90.5; 417/423.4
(58) Field of Search .................. 417/423.4, 423.12, 417/372, 373, 423.8; 310/90.5

(56) References Cited

U.S. PATENT DOCUMENTS

| | | | | |
|---|---|---|---|---|
| 5,760,511 A | * | 6/1998 | Nakagawa et al. | 310/90.5 |
| 5,856,719 A | * | 1/1999 | De Armas | 310/103 |
| 5,928,131 A | * | 7/1999 | Prem | 600/16 |
| 6,020,665 A | * | 2/2000 | Maurio et al. | 310/90.5 |
| 6,078,119 A | * | 6/2000 | Satoh et al. | 310/90.5 |
| 6,123,522 A | * | 9/2000 | Kubo et al. | 417/423.4 |
| 6,191,513 B1 | * | 2/2001 | Chen et al. | 310/90 |
| 6,201,329 B1 | * | 3/2001 | Chen | 310/90.5 |
| 6,215,218 B1 | * | 4/2001 | Ueyama | 310/90.5 |

FOREIGN PATENT DOCUMENTS

| | | |
|---|---|---|
| DE | 4410903.2 | 10/1995 |
| EP | 0597365 A1 | 5/1994 |
| JP | 1-224627 | 9/1989 |
| JP | 8-338393 | 12/1996 |
| JP | 8-338432 | 12/1996 |
| JP | 9-189326 | 7/1997 |
| JP | 9-257035 | 9/1997 |

* cited by examiner

Primary Examiner—Charles G. Freay
Assistant Examiner—William Rodriguez
(74) Attorney, Agent, or Firm—Armstrong, Westerman & Hattori, LLP

(57) ABSTRACT

The present invention is to provide a magnetic bearing controller capable of reliably controlling the position of a floating member at a target position, even when the length of the cable connecting the magnetic bearing and the controller is changed.

The magnetic bearing controller comprises: an electromagnet for supporting a floating member in a floating state; sensors (Z1, Z2) for sensing the floating position of the floating member; and a controller for supplying sensor signals and an exciting currents via cables to the sensors and electromagnets, respectively, in order to support the floating member at a predetermined floating position based on signals received from the sensors, wherein the controller comprises. a signal source (11) for supplying an AC signal to the sensors (Z1, Z2); a pair of sensor drive circuits (12) for supplying differential signals via cables (C) connected to both ends of the serially connected sensor elements (Z1, Z2); whereby the cables are disposed with balanced condition and capacitance generated by the length of the cable is canceled. The main pump section and controller of a turbo-molecular pump apparatus can be integrally formed.

8 Claims, 6 Drawing Sheets

MAGNETIC BEARING CONTROL DEVICE AND TURBO-MOLECULAR PUMP DEVICE

TECHNICAL FIELD

The present invention relates to a magnetic bearing controller for holding a floating member such as the rotating shaft of a pump in a non-contact floating state using the magnetic attraction force of an electromagnet, and particularly to a technique for connecting the magnetic bearing to a sensor drive circuit on the controller end for detecting the floating position of the floating member. The present invention also applies to a turbo-molecular pump apparatus equipped with a magnetic bearing.

BACKGROUND ART

Magnetic bearings are used to support rotating shafts of pumps and the like in a non-contact state. Rotating shafts in a turbo-molecular pump supported by magnetic bearings, for example, are capable of rotating at a high rate of speed without causing wear and tear on the bearing. The magnetic bearing requires no lubricating oil and is therefore maintenance-free. These magnetic bearings include an active radial bearing for actively controlling the position of the rotating shaft in the radial direction or an active axial bearing for actively controlling the position of the rotating shaft in the axial (thrust) direction. A floating position controller in these magnetic bearings includes an electromagnet for supporting the floating member by the influence of magnetic attraction force, inductance-type displacement sensors for detecting the position of the floating member through variations in inductance, and a controller that controls the exciting current (i.e. magnetic attraction force) of the magnet based on the signal from the displacement sensors in order to support the floating member in the desired position.

In a magnetic bearing controller with this configuration, the electromagnet supporting the rotating shaft or the like and the sensor elements for detecting the position of the rotating shaft are integrally installed in a pump apparatus. However, the controller is ordinarily provided separate from the pump and connected to the pump via a cable. In this configuration the controller includes a power source for providing an exciting current to the electromagnet, a sensor circuit for receiving a signal detected by a sensor element and calculating the floating position, a PID (proportional plus integral plus derivative) control circuit for generating control output based on a comparison between output from the sensor circuit and the target floating position, and the like. Output from the sensor element installed in the pump is transferred to the sensor circuit in the controller via the cable.

FIG. 1 shows the construction of the sensor drive circuit in a conventional magnetic bearing controller. As described above, the magnetic bearing controller includes an electromagnet (not shown) supporting the floating member by magnetic attraction force; sensor elements Z1 and Z2, such as inductance-type position sensors, disposed near the electromagnet; and a control circuit that receives the output signals from the sensor elements Z1 and Z2 and supplies an exciting current to the electromagnet in order to support the floating member in a desired floating position. Also as described above, the magnetic bearing and controller are connected via a cable C.

A sensor drive circuit includes an AC signal source 11, an amplifier 12 for amplifying the signal from the AC signal source 11, a current limiting resistance 13, a resonance condenser 14, and the like. A circuit for measuring displacement in the floating member is configured by a bridge circuit bridging a central point between reference resistances Ra and Rb having a central point A connected to the output terminal of the control sensor drive circuit and the sensor elements Z1 and Z2 on the magnetic bearing side connected to the reference resistances via the cable and having a center point B. A differential amplifier extracts voltages from center points A and B between the serially connected Ra and Rb and Z1 and Z2, amplifies the signals, and outputs a displacement signal.

With this configuration, the bridge circuit linking the resistances Ra and Rb and sensor elements Z1 and Z2 calculates the position displacement of the floating member as changes in inductance between the sensor elements Z1 and Z2 by comparing the voltages at the displacement point B and the reference point A. However, the magnetic bearing and controller are connected by cables as described above having capacitances C1, C2, and the like. These capacitances C1 and C2 vary according to the length of the cables C. Accordingly, if the length of the cable changes after the sensor circuit is adjusted for the cable length, then the cable capacitances C1, C2, and the like will also change, as well as the voltage at the displacement point B between sensor elements Z1 and Z2 in relation to the reference point A of the bridge circuit. As a result, it is not possible to accurately detect the position of the floating member using this construction. Errors made in positional measurement will throw off the position of the floating member controlled according to this measurement. As a result, the sensor circuit must be adjusted whenever the length of cable is modified.

DISCLOSURE OF INVENTION

In view of the foregoing, it is an object of the present invention to provide a magnetic bearing controller capable of reliably controlling the position of a floating member at a target position, even when the length of the cable connecting the magnetic bearing and the controller is changed.

According to first aspect of the present invention, there is provided a magnetic bearing controller, which comprises an electromagnet for supporting a floating member in a floating state; sensors for sensing the floating position of the floating member; and a controller for supplying sensor signals and an exciting currents via cables to the sensors and electromagnets, respectively, in order to support the floating member at a predetermined floating position based on signals received from the sensors, wherein the controller comprises: a signal source for supplying an AC signal to the sensors; a pair of sensor drive circuits for supplying differential signals via cables connected to both ends of the serially connected sensor elements; two reference resistances that form a bridge circuit with the two sensor elements connected to the sensor drive circuit; and a sensor circuit for detecting a differential voltage between a center point of the sensor elements and a center point of the reference resistances connected by the bridge circuit. Whereby the cables are disposed with balanced condition and capacitance generated by the length of the cable is canceled.

With this construction, the AC signal source is connected to two amplifiers that drive the sensor elements Z1 and Z2 on the magnetic bearing side with balanced differential signals. As a result, the reference point A at a center point between the Ra and Rb serves as a virtual ground, while the displacement point B at a center point between the Z1 and Z2 also serves as a virtual ground in relation to the capacitance. Since the capacitance of the cables contrast with each other at points A and B, the effect of the cable capacitances are cancelled. Accordingly, if the lengths of the cables are changed, the capacitances C1 and C2 will change in proportion to the lengths, but the effects based on the differential output from the bridge circuit are canceled. Therefore, the differential voltage produced between points A and B does not change. As a result, the sensor circuit need not be adjusted even when the cable lengths are changed.

According to second aspect of the present invention, there is provided a magnetic bearing controller, which comprises an electromagnet for supporting a floating member in a floating state; a sensor for sensing the floating position of the floating member; and a controller for supplying a sensor signal and exciting current based on the signal received from the sensor via cables to the sensor and electromagnet, respectively, for supporting the floating member at a predetermined floating position, wherein the controller comprises: a signal source for supplying an AC signal to the sensor; a sensor drive circuit for supplying the signal from the signal source via cables connected to both ends of serially connected sensor elements; reference resistances having a center point; a sensor circuit for detecting a differential voltage between a center point of the two sensor elements connected in series and the center point of the reference resistances; a DC signal superimposing circuit for superimposing a DC signal on the AC signal output from the signal source; and a DC signal measuring circuit for detecting the DC signal on the controller side connected via the cables including the sensor elements, whereby the length of the cable is determined.

According to another aspect of the present invention, a voltage corresponding to the length of the cable is converted to a voltage corresponding to capacitance in the cable and added to the sensor circuit to compensate for changes in the length of the cable, whereby the floating position of the floating member does not change.

With this construction, a DC current is superimposed on the AC signal and the DC voltage component including the cable length and sensor elements is extracted by the DC resistance detecting circuit. The extracted DC voltage component is compared to a reference voltage in the DC resistance detecting circuit. The difference is output as a DC voltage corresponding to the length of the cable. Hence, the length of the cable can be determined by this DC voltage. By adding the capacitance of this DC voltage corresponding to the length of the cable to the sensor circuit as a compensating voltage, it is possible to compensate for the effects of capacitance caused by the length of the cable, thereby not changing the floating position of the floating member.

According to third aspect of the present invention, there is provided a turbo-molecular pump apparatus, which comprises a main pump section having an electromagnet for supporting a rotating member in a floating state and a sensor for detecting the floating position of the rotating member; and a controller for supplying a sensor signal and exciting current via a cable to the sensor and electromagnet respectively based on signals from the sensor in order to support the floating member at a predetermined floating position; wherein the main pump section and the controller are integrally formed as one unit and further comprising a cooling jacket through which cooling water flows for cooling both the main pump section and the controller.

With this construction, the main pump section and controller are formed integrally, thereby eliminating the need for a cable connecting the two, as well as the need for laying out the cable. This construction also eliminates the possibility of error in connecting the cables. By eliminating the cable, there is no need to adjust the controller based on the length of a cable. This configuration also introduces interchangeability between the main pump section and controller. Further the configuration decreases noises entering into the cable, and increases tolerance for noises.

Since both the main section and controller can be cooled simultaneously by the cooling water flowing through the cooling jacket, the controller does not require a cooling fan. When this apparatus is installed in a constant-temperature clean room or some other location that requires the room to be maintained at a constant temperature, using expensive clean air is not necessary for cooling the controller, thereby eliminating the source of a hotshot.

BEST MODE FOR CARRYING OUT THE INVENTION

A magnetic bearing controller according to preferred embodiments of the present invention will be described while referring to the accompanying drawings.

Figure 1:
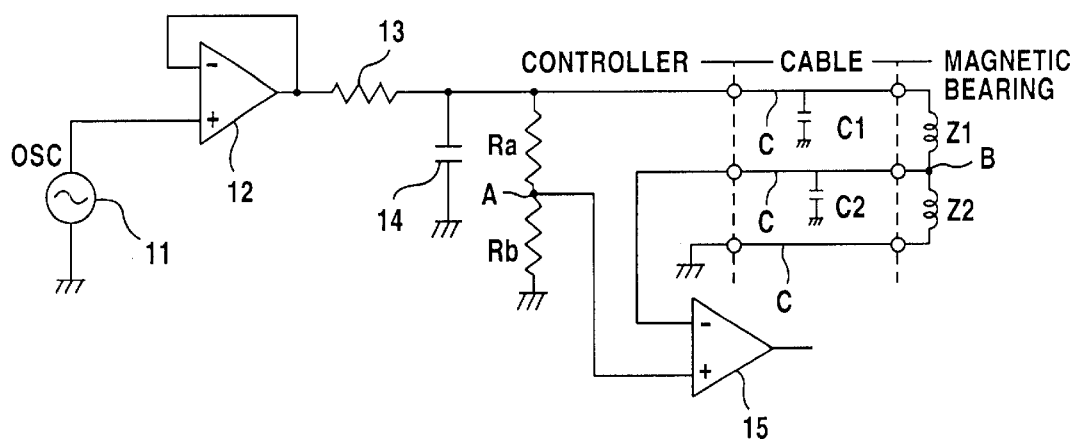
FIG. 1 is a circuit diagram showing a sensor drive circuit of the prior art.
Figure 2:
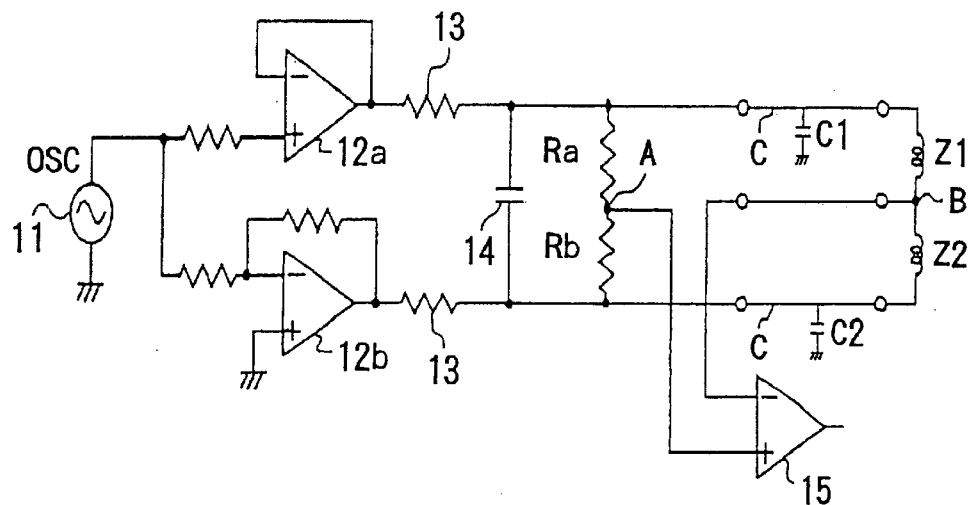
FIG. 2 is a circuit diagram showing a sensor drive circuit according to a first embodiment of the present invention.

FIG. 2 shows the construction of a sensor drive circuit according to the first embodiment of the present invention. As shown in the drawing, output from an AC signal source 11 in the sensor drive circuit is divided to connect to differential amplifiers 12a and 12b. The outputs of amplifiers 12a and 12b are connected to sensor elements Z1 and Z2 of the magnetic bearing via current limiting resistances 13 and cables C. The cables C also connect one to either end of a resonance condenser 14 and one to either end of reference resistances Ra and Rb connected in parallel to the resonance condenser 14. The voltage is extracted from a reference point A at a center point between reference resistances Ra and Rb and a displacement point B at a center point between sensor elements Z1 and Z2, which two points make up the bridge circuit. The voltages are input into a differential amplifier 15. This configuration is the same as the conventional technology shown in FIG. 1.

With this construction, a balanced drive voltage can be supplied from the amplifiers 12a and 12b to the sensor elements Z1 and Z2, respectively. By setting resistance Ra equal to resistance Rb, the point A between resistances Ra and Rb connected to the output terminal of the sensor drive circuit becomes a virtual ground. The capacitances C1 and C2 in the cables C connected to the sensor elements Z1 and Z2 are both in balance based on the reference point A and displacement point B that serve as differential input terminals to the differential amplifier 15 and are therefore cancelled. Hence, the capacitances C1 and C2 have no effect on the differential amplifier 15 and the differential amplifier 15 can accurately extract the amount of impedance variation output from the sensor elements Z1 and Z2 in response to the displacement of the floating member.

Figure 3:
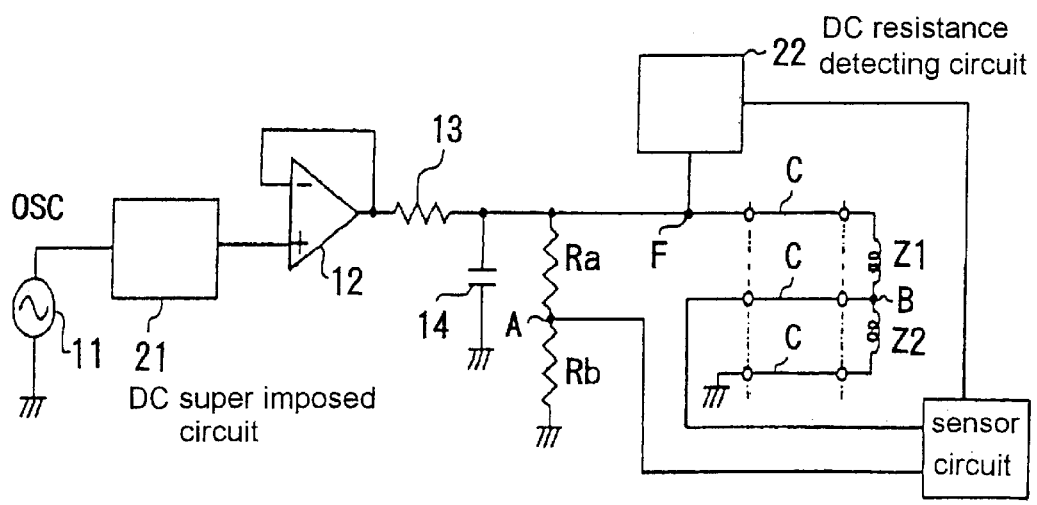
FIG. 3 is a circuit diagram showing a sensor drive circuit according to a second embodiment of the present invention.

FIG. 3 shows the construction of a sensor drive circuit according to a second embodiment of the present invention. As shown in FIG. 3, a DC superimposed circuit 21 is connected to the AC signal source 11 for adding a superimposed DC signal component to the signal output from the AC signal source 11. A DC resistance detecting circuit 22 is connected near the output terminal of the sensor drive circuit where the cable C is connected. The DC resistance detecting circuit 22 detects only the DC component of the voltage supplied to the sensor elements Z1 and Z2 via the cable C. The DC resistance detecting circuit compares the voltage of this DC component to its reference voltage and calculates the DC voltage component corresponding to the length of the cable based on this difference. The cable length can be determined from the magnitude of this DC voltage.

Figure 4:
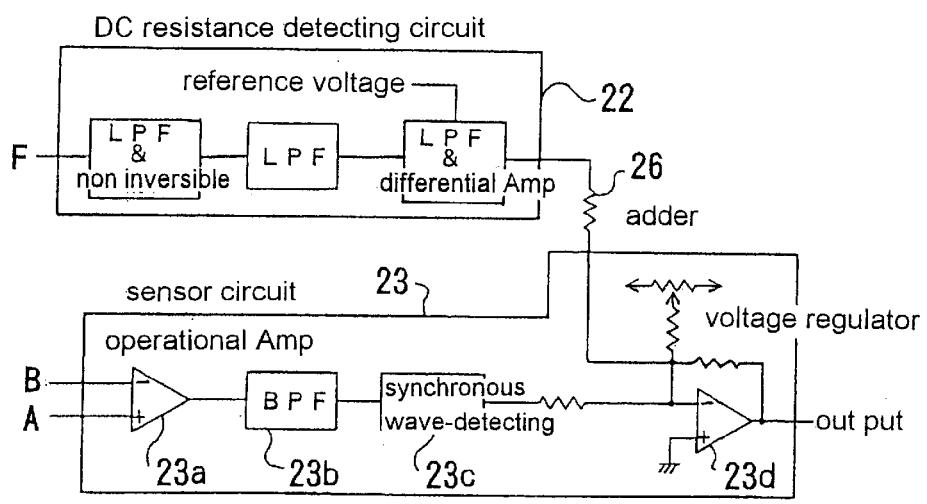
FIG. 4 is a block diagram showing a detail of the DC resistance detecting current and sensor circuit.

FIG. 4 shows an example construction of a circuit used to compensate for capacitance based on the length of cable found by the DC resistance detecting circuit described above. The DC resistance detecting circuit 22 is constructed with low pass filters (LPF) connected in three cascaded stages capable of extracting only the DC current component from the AC signal superimposed with a DC current component. The output from the DC resistance detecting circuit 22 is input via an adder 26 into a voltage regulator 23d of a sensor circuit 23. The sensor circuit 23 receives the differential output of the reference point A and displacement point B. A differential amplifier 23a amplifies this voltage input into the sensor circuit 23. Only the AC component of the voltage passes through a band pass filter (BPF) 23b. A synchronous wave detector 23c detects the amount of the AC component and outputs a proportional DC component.

The output of the synchronous wave detector 23c is input into the voltage regulator 23d. In the voltage regulator 23d, the amount of voltage equivalent to the effects of capacitance corresponding to the length of cable is added to the voltage signal. Hence, the sensor circuit 23 compensates for the effects of capacitance variations in the cable, enabling these effects to be cancelled even if the length of the cable is changed. In other words, if the length of the cable changes, it will still be possible to detect and control the position of a floating member accurately.

Figure 5:
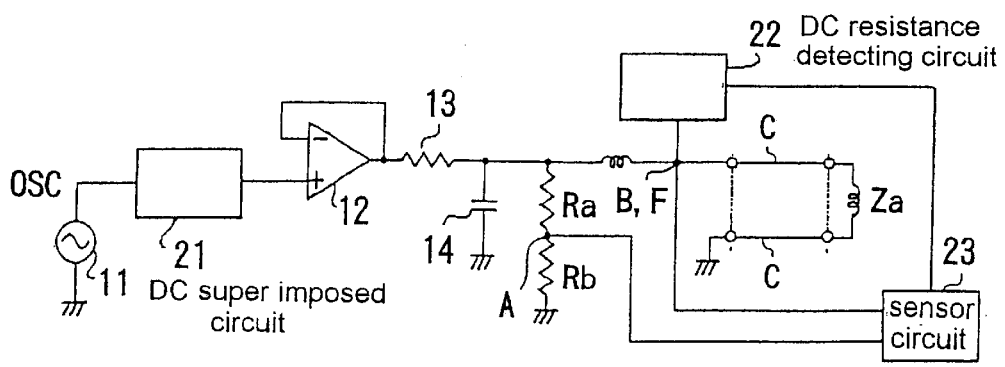
FIG. 5 is a circuit diagram showing a variation of the sensor drive circuit according to the second embodiment of the present invention.

The sensor drive circuits of the first and second embodiments can be combined. For example, when a sensor cannot be installed opposite an axial magnetic bearing in a magnetic bearing system employing five-axis control, the DC superimposed circuit shown in FIGS. 3 and 4 can be used for the axial magnetic bearing, while a differential drive method as shown in FIG. 2 can be used for the radial magnetic bearing, thereby combining both methods. The sensor drive circuit for a magnetic bearing shown in FIG. 5 replaces the two sensor elements(Za, Zb) in the sensor drive circuit of FIG. 3 with one sensor element(Za).

The sensor element in the embodiments described above is an inductance-type displacement sensor. However, it is obvious that the present invention applies equally to a sensor element using another element in which impedance varies according to displacement.

In the embodiments described above, the magnetic bearing and controller for driving the magnetic bearing are connected via a long cable, and the floating position of the floating member can be measured and controlled accurately, even if the length of the cable is changed. This construction also contributes to decreasing the installation area required by the apparatus because the equipment section containing the magnetic bearing and the controller for controlling the magnetic bearing can be installed at separate locations and connected with a cable. If the equipment layout is modified at the installment site requiring the length of cable to be modified, it is still possible to continue stable operations without the position of the floating member being affected by the length of the cable.

A turbo-molecular pump apparatus is suitable for use in semiconductor manufacturing equipment and the like employed in extremely clean or vacuum environments. Generally, a magnetic bearing is employed to support the rotating member (rotor) of the pump without mechanical contact. A pump apparatus is equipped with an electromagnet (magnetic bearing) for supporting the rotating member in a floating state and a sensor for detecting the floating position of the rotating member. ordinarily the pump apparatus is connected via a cable to a controller that receives sensor signals from the sensor and supplies an exciting current based on the sensor's signals to the electromagnet to support the floating member in a predetermined position.

Figure 6:
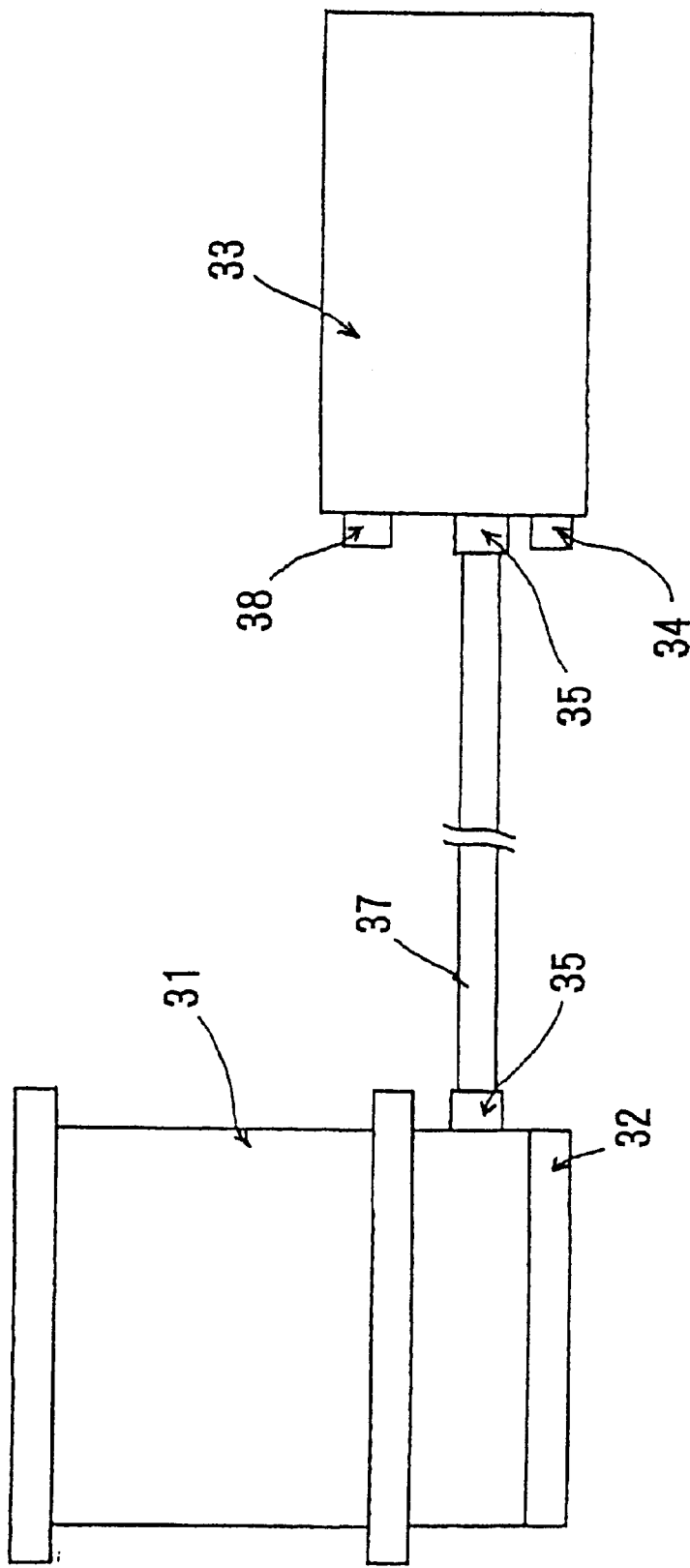
FIG. 6 is an explanatory diagram showing a structure of a turbo-molecular pump apparatus.

As shown in FIG. 6, the turbo-molecular pump includes a main pump section 31 and a controller 33 configured separately for controlling the main pump section 31. A cable 37 connects the main pump section 31 and controller 33. The turbo-molecular pump apparatus also includes a cooling jacket 32 through which cooling water flows for cooling the main pump section 31, a power supply connector 34, pump/controller connectors 35, and an external interface connector 38.

Since the main pump section 31 and controller 33 in this type of turbo-molecular pump apparatus is connected by a cable 37, it is desirable to apply the configuration of the first or second embodiment to avoid errors in operating the magnetic bearing being generated from the length of the cable 37. With this configuration, changes in the cable length caused by layout modifications at the work site and the like will not affect the operations of the turbo molecular pump.

If the above configuration is not employed in a turbo-molecular pump apparatus having a main pump section 31 and controller 33 configured separately, the length of the cable 37 will affect its capacitance, requiring that the controller 33 be adjusted each time whenever the length of the cable 37 changes. Further when combining a plurality of main pump sections 31 or similar but different types of main pump sections 31, there is a possibility of incorrectly connecting the cables 37.

A cooling fan is provided to cool the controller 33. If this device is installed in a work area that requires the room to be maintained at a uniform temperature, such as in a constant-temperature clean room, expensive clean air must be used in cooling and the apparatus will be the source of a hot spot. Therefore, a turbo-molecular pump apparatus according to a third embodiment of the present invention includes a main pump section and a controller for controlling the main pump section, wherein the controller and main pump section are integrally formed.

Figure 7A:
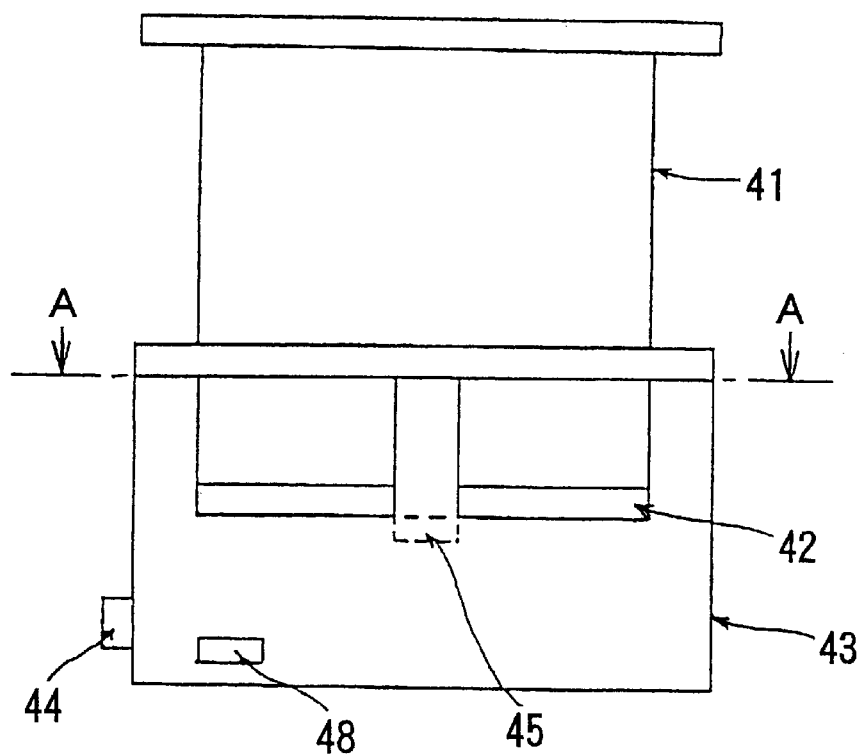
FIGS. 7A and 7B are a front view and cross-sectional view, respectively, showing the structure of a turbo-molecular pump apparatus according to a third embodiment of the present invention.
Figure 7B:
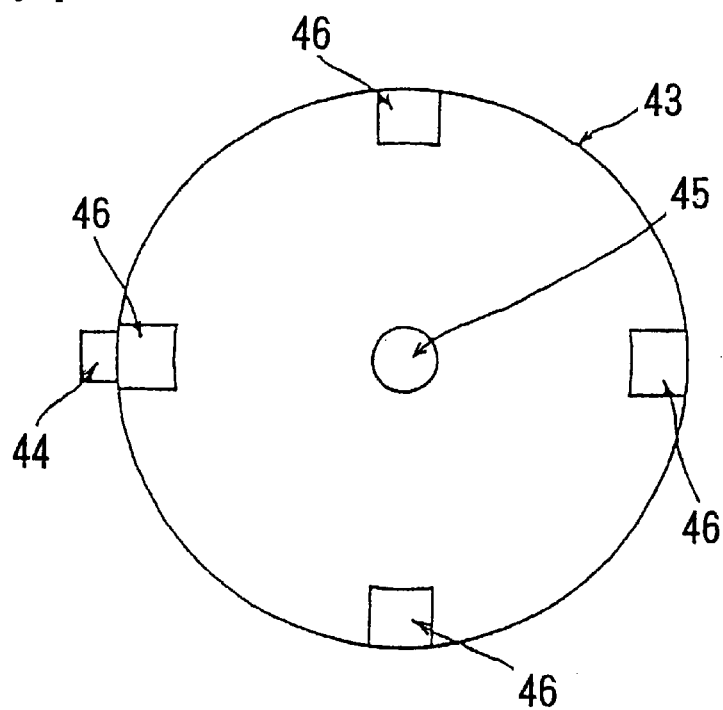

FIGS. 7A and 7B show the turbo-molecular pump apparatus according to the third embodiment. FIG. 7A is a front view of the turbo-molecular pump apparatus, while FIG. 7B is a cross-sectional view along the line A—A in FIG. 7A. The turbo-molecular pump apparatus includes a main section 41 and a controller 43. The main section 41 is configured to engage with the top of the controller 43. A pump/controller connector 45 connects the electrical system of the main section 41 and controller 43. A cooling jacket 42 in which pump cooling water flows is provided in order to cool both the main section 41 and controller 43.

The main section 41 and controller 43 are fixed together by anchoring feet 46 protruding from the controller 43. Both the main section 41 and controller 43 closely adhere to the cooling jacket 42. A power supply connector 44 is provided for supplying power to the controller 43. An external interface connector 48 is disposed on the controller 43 and functions to interface with external input/output devices. Hence, it is possible to control the apparatus with a remote controller or the like.

Figure 8:
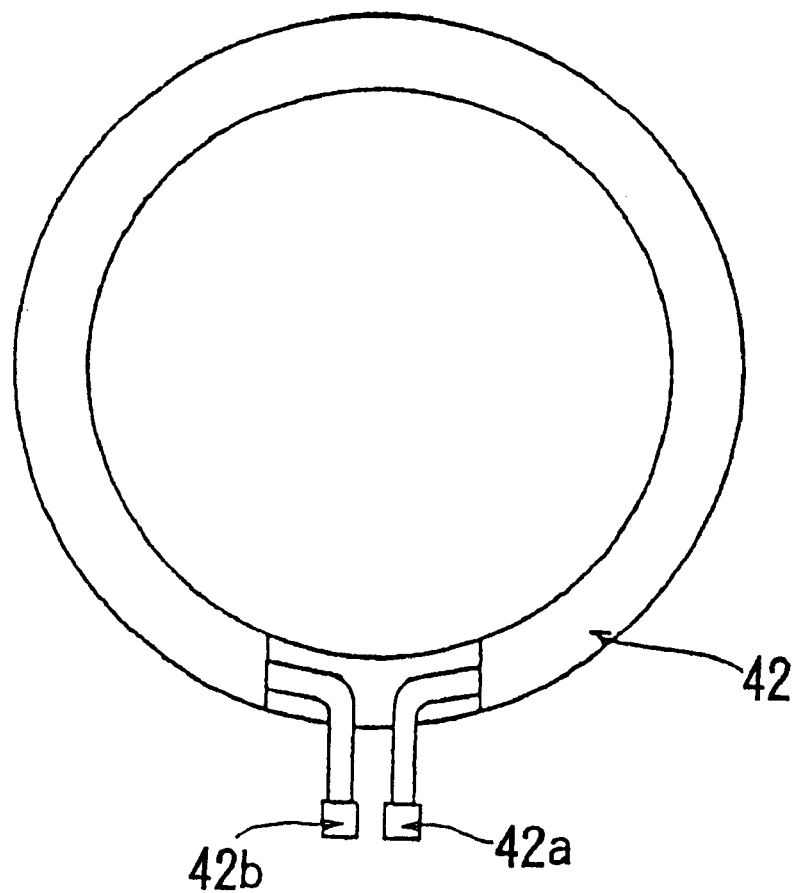
FIG. 8 is an explanatory diagram showing the cooling jacket of the turbo-molecular pump apparatus.

FIG. 8 shows a construction of the cooling jacket 42. The cooling jacket 42 is annular in shape and includes an inlet 42a and an outlet 42b. Cooling water is introduced into the inlet 42a and discharged from the outlet 42b to cool the main section 41 and controller 43 that are in close adherence with the cooling jacket 42. Since both the main section 41 and controller 43 can be cooled simultaneously by the cooling water flowing through the cooling jacket 42, the controller 43 does not require a cooling fan. When this apparatus is installed in a constant-temperature clean room or some other location that requires the room to be maintained at a constant temperature, a fan using expensive clean air is not necessary for cooling the controller 43, thereby eliminating the source of a hotspot.

By engaging the main section 41 on top of the controller 43 as described above, the main section 41 and controller 43 are integrally formed as one unit, eliminating the need for a cable connecting the main section 41 and controller 43, as well as the need for laying out the cable. Eliminating the cable gets rid of any problems associated with cable capacitance interfering with the control of the magnetic bearing.

By detachably mounting the main section 41 and the controller 43, it is possible to replae only either the controller or the main pump section if a failure occurs in one of these components, thereby improving the ease of maintenance. It is also possible to separate the controller from the main pump section environment (vacuum or corrosive gases) to protect the electrical elements in the controller, as well as to prevent corrosive gases and the like in the pump from being exposed to the air when detaching the controller from the man pump section.

While the examples of magnetic bearing controller of the present invention which is applied to the turbo molecular pump, have been described about it would be apparent to those skilled in the art that many modifications and variations may be made therein without departing from the scope of the invention, which is defined by the attached claims.

INDUSTRIAL APPLICABILITY

The present invention applies to a magnetic bearing apparatus for supporting a rotating shaft by magnetic attraction force without mechanical contact. The magnetic bearing apparatus can be used in a turbo-molecular pump apparatus or a wide range of other rotating equipment requiring a high rotation speed, high cleanliness, and no maintenance.

What is claimed is:

1. A magnetic bearing controller comprising:
    an electromagnet for supporting a floating member in a floating state;
    sensors for sensing the floating position of the floating member; and
    a controller for supplying sensor signals and an exciting currents via cables to the sensors and electromagnets, respectively, in order to support the floating member at a predetermined floating position based on signals received from the sensors, wherein the controller comprises:
        a signal source for supplying an AC signal to the sensors;
        a pair of sensor drive circuits for supplying differential signals via cables connected to both ends of serially connected sensor elements;
        two reference resistances that form a bridge circuit with the two sensor elements connected to the sensor drive circuit; and
        a sensor circuit for detecting a differential voltage between a center point of the sensor elements and a center point of the reference resistances connected by the bridge circuit;
        whereby the cables are disposed with balanced condition and capacitance generated by the length of the cable is canceled.

2. A magnetic bearing controller comprising:
    an electromagnet for supporting a floating member in a floating state;
    a sensor for sensing the floating position of the floating member; and
    a controller for supplying a sensor signal and exciting current based on the signal received from the sensor via cables to the sensor and electromagnet, respectively, for supporting the floating member at a predetermined floating position, wherein the controller comprises:
        a signal source for supplying an AC signal to the sensor;
        a sensor drive circuit for supplying the signal from the signal source via cables connected to both ends of serially connected sensor elements;
        reference resistances having a center point;
        a sensor circuit for detecting a differential voltage between a center point of the two sensor elements connected in series and the center point of the reference resistances;
        a DC signal superimposing circuit for superimposing a DC signal on the AC signal output from the signal source; and
        a DC signal measuring circuit for detecting the DC signal on the controller side connected via the cables including the sensor elements, whereby the length of the cable is determined.

3. A magnetic bearing controller according to claim 2, wherein a voltage corresponding to the length of the cable is converted to a voltage corresponding to capacitance in the cable and added to the sensor circuit to compensate for changes in the length of the cable, whereby the floating position of the floating member does not change.

4. A turbo-molecular pump apparatus comprising:
    a main pump section having an electromagnet for supporting a rotating member in a floating state and a sensor for detecting the floating position of the rotating member; and
    a controller for supplying a sensor signal and exciting current to the sensor and electromagnet respectively based on signals from the sensor in order to support the floating member at a predetermined floating position;
    wherein the main pump section and the controller are integrally formed as one unit, and the controller comprises:

a signal source for supplying an AC signal to the sensors;

a pair of sensor drive circuits for supplying differential signals via cables connected to both ends of serially connected sensor elements;

two reference resistances that form a bridge circuit with the two sensor elements connected to the sensor drive circuit; and a sensor circuit for detecting a differential voltage between a center point of the sensor elements and a center point of the reference resistances connected by the bridge circuit;

whereby the cables are disposed with balanced condition and capacitance generated by the length of the cable is canceled.

5. A turbo-molecular pump apparatus according to claim 4, wherein the main pump section and the controller are detachably mounted.

6. A turbo-molecular pump apparatus according to claim 4, wherein the controller includes an interfacing device with external input/output.

7. A turbo-molecular pump apparatus according to claim 5, wherein the controller includes an interfacing device with external input/output.

8. A turbo-molecular pump apparatus according to claim 4, further comprising a cooling jacket through which cooling water flows for cooling both the main pump section and the controller.

* * * * *